R. KLEIN.
PHOTOGRAPHIC SHUTTER.
APPLICATION FILED AUG. 29, 1917.

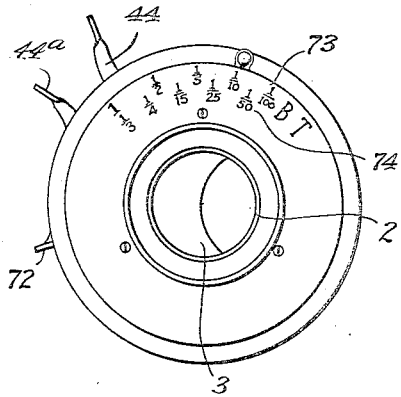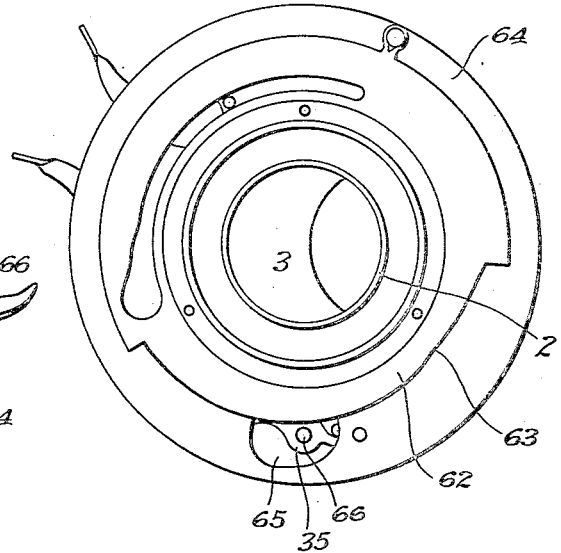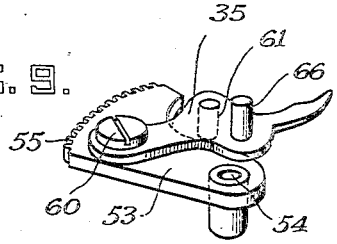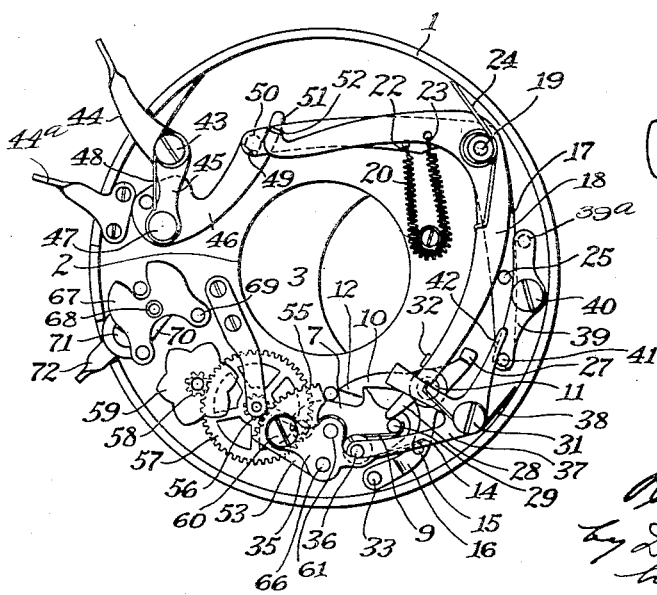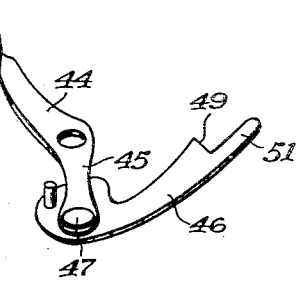

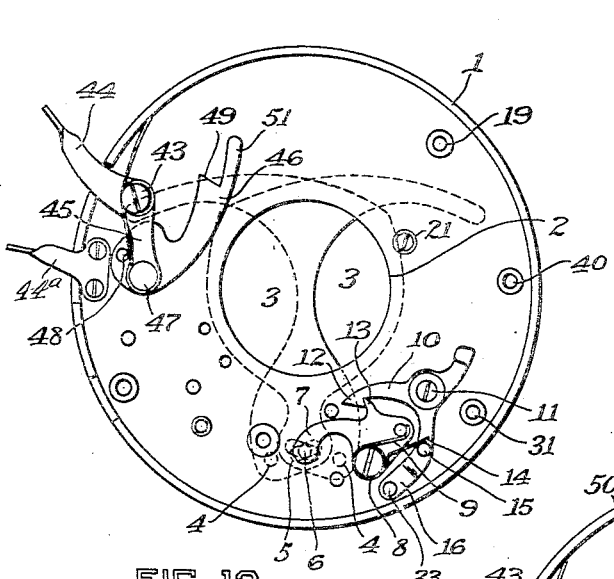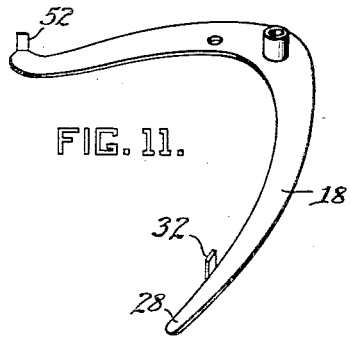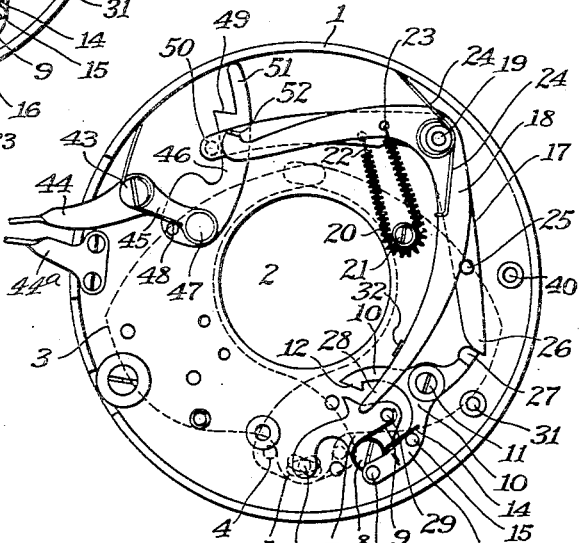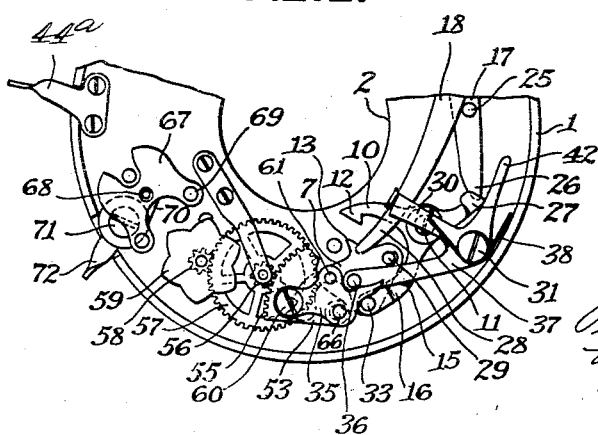

1,287,045.

Patented Dec. 10, 1918.
3 SHEETS—SHEET 3.

INVENTOR:
Rudolph Klein
by Davis & Simms
his attorneys

UNITED STATES PATENT OFFICE.

RUDOLPH KLEIN, OF ROCHESTER, NEW YORK, ASSIGNOR TO ILEX OPTICAL COMPANY, OF ROCHESTER, NEW YORK, A CORPORATION.

PHOTOGRAPHIC SHUTTER.

1,287,045.     Specification of Letters Patent.     Patented Dec. 10, 1918.

Application filed August 29, 1917. Serial No. 188,829.

*To all whom it may concern:*

Be it known that I, RUDOLPH KLEIN, a citizen of the United States, and resident of Rochester, in the county of Monroe and State of New York, have invented certain new and useful Improvements in Photographic Shutters, of which the following is a specification.

The present invention relates to photographic shutters, the present embodiment being designed more particularly for the type in which there is provided a motor means in which energy is stored without affecting the position of the shutter blades, said motor means being released after such storing of the energy to effect the opening and then the closing of the shutter blades. An object of this invention is to provide an improved control of the shutter blades by the motor means, so that the blades may be opened under the force of their own spring or motor, and then closed under the force of the motor means. A further object of the invention is to provide a latch for holding the shutter blades closed with their spring under tension, said latch being controlled by a motor means which also effects the closing of the blades. A further object of the invention is to provide a motor means having two relatively movable members, one of which effects the opening of the shutter blades and the other of which effects the closing of the blades, a detent preferably being provided controlled by the first named member and holding the second named member against action. Still another object of the invention is to provide a retarding mechanism having retarding action in two opposite directions with connecting means between said retarding mechanism and the motor means, whereby, during one operation of the shutter, the retarding device is moved in both directions. A still further object of the invention is to construct the connecting means between the motor means and the retarding device in the form of two separate connectors, one of which moves the retarding device in one direction, and the other of which moves the retarding device in the opposite direction, both of said connectors being brought into operation during one operation of the shutter.

To these and other ends, the invention consists of certain parts and combinations of parts all of which will be hereinafter described, the novel features being pointed out in the appended claims.

In the drawings:—

Figure 1 is a front view of a shutter constructed in accordance with the present invention;

Fig. 2 is a view of the shutter enlarged with the scale plate removed;

Fig. 3 is an enlarged interior view of the shutter;

Fig. 4 is an interior view with parts removed, showing the manner in which the latch holds the shutter blades closed;

Fig. 5 is a view showing the retarding device removed and illustrating the coöperation between the two members of the motor means and the exposure mechanism;

Fig. 6 is a fragmentary view, showing the retarding device associated with the motor mechanism;

Fig. 9 is an enlarged detail perspective view of a portion of the retarding device;

Fig 10 is an enlarged detail perspective view of the actuating member;

Figs. 11 and 12 are enlarged detail perspective views of two motor members; and

Fig. 13 is a detail perspective view of one of the levers employed in connection between the motor means and the retarding device.

Figure 7:
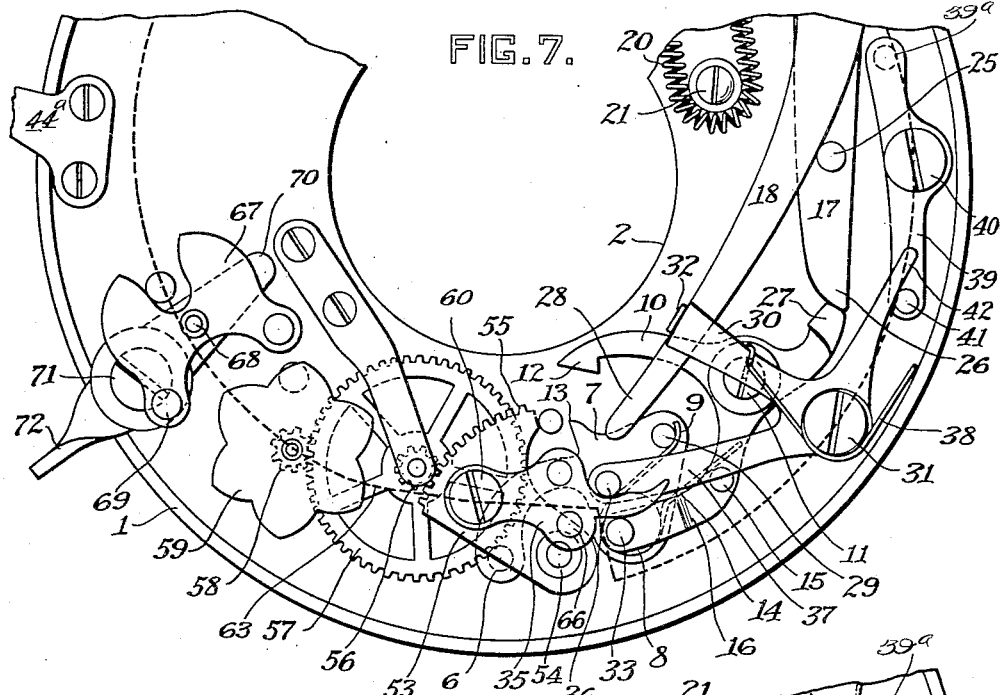
Fig. 7 is a still further enlarged view, showing the retarding device adjusted for the minimum instantaneous exposure, with the shutter blades open and the retarding device shifted out of action.
Figure 8:
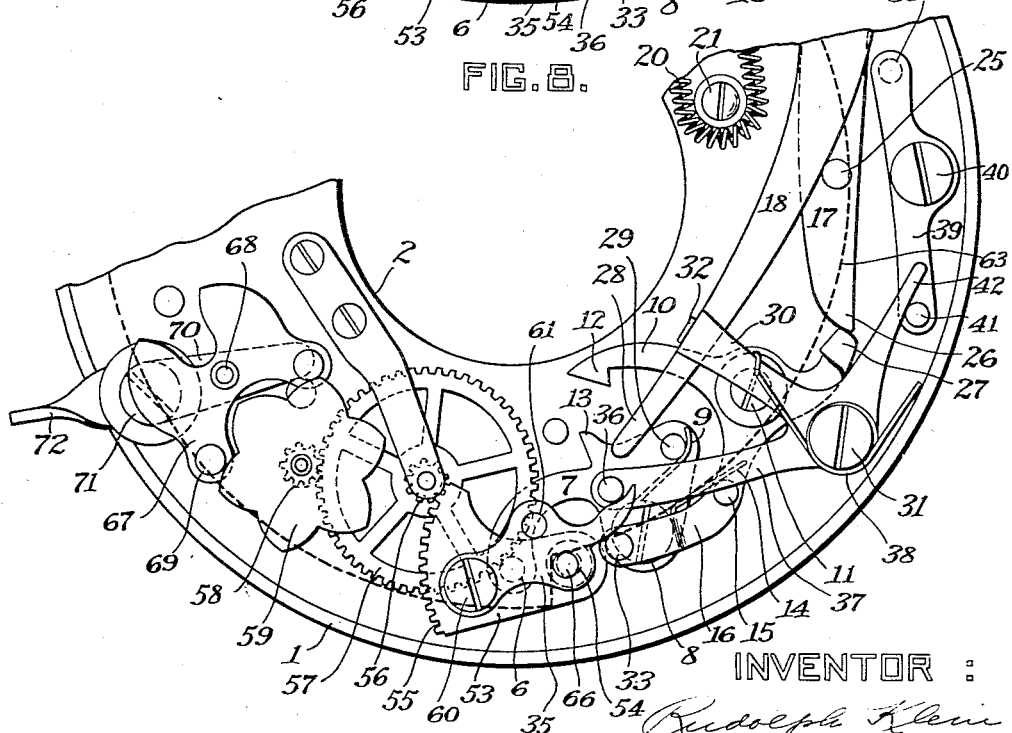
Fig. 8 is a view similar to Fig. 7, in which the retarding device is shifted into action for the maximum duration of automatically timed exposure.

Referring more particularly to the drawings, 1 indicates a casing having an aperture 2 controlled by an exposure mechanism which, in this instance, comprises two blades 3, separately pivoted at 4, and having crossed slots 5 in which a pin 6 on an exposure lever 7 operates. This exposure lever is pivoted at 8, and is acted upon by one arm 9 of a spring which is coiled about the pivot 8, this spring arm tending to act on the exposure lever in a direction to open the shutter blades 3. With the end in view of holding the blades closed, a latch 10 is provided pivoted at 11 and having a nose 12 engaged in the nose 13 on the exposure lever. The arm 14 of the spring which surrounds the pivot 8 engages a projection 15 on an arm 16 of the latch to hold the latch in coöperation with the exposure lever.

For effecting the opening and closing of the shutter blades, a motor means is provided. This means may be of any suitable construction, but, in this instance, it embodies two double-arm levers 17 and 18 mounted on a common pivot 19 and acted upon by a common motor spring 20, which, in this instance, is in the form of a coil spring passed between its ends around a projection 21, and having its ends 22 and 23 engaging, respectively, the motor levers or members 17 and 18. If desired, an additional spring 24 may surround the pivot 19 of the levers and engage the lever 18. A lateral projection 25 on the lever 17 may engage the lever 18, so that when the lever 17 is moved in the direction to store energy in the springs 20 and 24, the lever 18 will be caused to move therewith, while at the same time this projection will permit the lever 17 to move in advance of the lever 18 to effect the opening of the shutter blades. This opening movement is produced by the end 26 of the lever 17 coöperating with the beveled projection 27 on an arm of the latch 10, the coöperation being such that when the lever 17 is moved during the storing of energy in the spring 20, the end 26 will slip over the beveled projection 27 without affecting the position of the latch 10, but upon the return movement of the motor member 17, under the action of the spring 20, the end 26 of the lever 17 will engage the projection 27, and cause the latch nose 12 to be disengaged from the nose 13 of the exposure lever 7, thus permitting the spring arm 9 to open the shutter blades. After a time, the end 26 of the lever 17 slips off the projection 27, due to the turning of the latch 10 and the lever 17 on different centers, thus permitting the latch to be freed in order that the latch may return to a position where it may again engage the exposure lever 7. At the time that the motor member 17 slips off the projection 27, the end 28 of the motor member 18 will lie in a spaced position with reference to the projection 29 on the exposure lever 7, and as long as this end 28 of the motor member 18 is held away from the projection 29, the shutter will remain open. After a time, however, these two parts are brought into coöperation, and the spring 20, together with the spring 24, being stronger than the spring arm 9, causes the motor member 17 to shift the exposure lever to close the blades, in which position they are again held by the latch 10.

With the object in view of delaying the movement of the motor member 18, a detent 30 is provided which is preferably pivoted at 31 and has its end adapted to be thrown into the path of a lateral projection 32 on the motor member 18, this action being produced by a lateral projection 33 on the arm 16 of the latch 10, said projection 33 engaging on one side of a lever 35, the mounting of which will be hereinafter more fully set forth. The opposite side of said lever is engaged by a projection 36 on an arm 37 on the detent 30, so that, when the latch 10 is shifted by the motor member 17 to release the exposure mechanism, said latch also shifts the detent 30 into the path of the projection 32 on the motor member 18, and at the same time places under tension the spring 38 that surrounds the pivot 31 and acts on the detent. After a time, the motor member 17 engages one arm of a two-arm lever 39, which is pivoted at 40 between its ends, and has its other arm provided with a lateral projection 41 engaging an arm 42 formed on the detent on that side of the pivot of the latter opposite the arm 37. This engagement of the motor member 17 with the pin 39$^a$ on the two-arm lever 39 causes the latter to shift the detent 30 out of the path of the projection 32, thus permitting the motor member 18 to continue its movement until the end 28 thereof engages the projection 29 and closes the shutter blades, said member 18 being held in engagement with the projection 29 when the blades are closed, so that the force of the spring 20 is exerted on the exposure mechanism to hold the blades closed in opposition to the spring 9 which effects the opening of the blades.

Any suitable means may be employed for storing energy in the motor means. In this instance, an actuating lever is pivoted at 43 and has an arm 44 extending to the exterior of the casing of the shutter to be employed as a finger piece for manipulating the actuator. A rigid finger piece 44$^a$ on the casing acts as an anchor for the forefinger of the hand of a user as the thumb is operating the finger piece 44. On another arm 45 a latch 46 is pivoted at 47, a spring 48 acting on said latch to hold it in one direction. This latch has a shoulder 49 adapted to coöperate with the lateral projection 50 on the motor member 17, in order to shift said motor member until such a time that the projection 51 on the latch shall coöperate with the interior wall of the casing 1 and effect a disconnection between the latch and the motor member, thus permitting the motor member to return independently of the latch under the action of its spring 20, it, of course, being understood that when the motor member 17 is shifted by the actuating means the motor 18 will also be shifted through the medium of the projection 25. The lever 18 is provided with a lateral projection 52 with which detaining means, not shown, of any suitable construction may coöperate, it being customary in this art at the present time to employ one or more detents controlled by the actuating means for producing what is known as the "bulb and time" exposures, as distinguished from so called instantaneous or automatically timed exposures.

The shutter is provided with a retarding mechanism of novel construction and operation. This retarding mechanism, in this instance, embodies two retarding devices both adapted to act upon the motor means, and one acting through the other and adapted to be thrown into and out of connection at will.

One of these retarding devices is in the form of a train of wheels comprising preferably an oscillatory member 53 pivoted at 54 and having a gear segment 55 thereon meshing with a pinion 56 on a gear wheel 57, the latter, in turn, meshing with a pinion 58 on what might be called a "star" wheel 59. The lever 35 heretofore mentioned preferably also forms part of this retarding device and is pivoted at 60 on the oscillatory member 53. It also has a lateral depending projection 61 which is adapted to coöperate with one side of the oscillatory member 53 when the lever is moved in one direction. Provided no restraining influence is imposed upon the lever 35, the latter moves back and forth without in any way affecting the oscillatory member 53, or the train of wheels. However, this lever is used to control the action of the retarding mechanism, and to this end an annular cam member 62 with a cam surface 63 thereon is mounted to turn on the top plate 64 of the casing, said top plate having an opening 65 through which a lateral projection 66 on the lever 35 extends, said projection being adapted to coöperate with the cam surface 63. This cam surface is so formed that at one extreme end the lever 35 may be freely moved with reference to the oscillatory member 53, without producing any operative movement in the latter, while, at the other extreme end, the cam 63 will engage the projection 66 in such a manner that no relative movement between the lever 35 and the oscillatory member 53 may take place. Intermediate portions of the cam 63 permit movements of the member 35 relatively to the oscillatory member 53 of various lengths. When the lever 35 is held against any movement relatively to the member 53, the latch projection 33, acting on the lever 35, tends not only to move the lever 35, but also to move the oscillatory member 53, and this is also true of the projection 36 on the arm 37 of the detent 30, which moves the lever 35 in the opposite direction, as the arm 35 then practically becomes rigid with the member 53. As the cam 63 permits relative movements between the lever 35 and the oscillatory member 53 of various lengths, it follows that, after such relative movements, the arm 35 and the oscillatory member 53 will move together as one rigid part, under the action of the projection 33 of the latch 10, and upon the return movement of the lever 35, under the action of the projection 36, this rigid relation will be maintained until the retarding action is completed, when the lever will move to its initial position with reference to the oscillatory member 53. From the foregoing it will be seen that the latch 10 with the parts carried thereby forms a connector between the motor member 17 and the motor means for moving the retarding device in one direction, while the lever 39 and the detent 30 with its coöperating parts form a connector for moving the retarding device in the opposite direction. Both of these movements of the retarding device are effected during one operation of the shutter, that is, an operation which effects the opening and then the closing of the shutter blades.

The second retarding device is preferably in the form of an oscillatory member or anchor 67 pivoted at 68, and having two projections 69 for coöperation with the periphery of the star wheel 59 to retard the action of said star wheel when the latter is moved in either direction. This anchor or oscillatory device is preferably pivoted on an arm 70 which, in turn, is pivoted at 71 and has a finger piece 72 extending to the exterior of the casing of the shutter, whereby said anchor may be thrown at will into and out of coöperation with the star wheel 59 of the first mentioned retarding device. As this second mentioned retarding device is movable independently of the controlling cam or body 62, it is possible to use one cam surface on said controlling body for obtaining two ranges of speeds, in other words, the cam surface 63 may be utilized for attaining a great number of speeds with the train of wheels alone, and a still further range may then be obtained by throwing in the anchor 67. It is for this reason that the casing of the shutter is provided with two scales 73 and 74. For a given adjustment in the controlling member, it is possible to obtain with this construction a greater and finer adjustment of speeds than it is possible with a construction in which the controlling body is provided with two separate controlling surfaces, one for each retarding device.

From the foregoing it will be seen that there has been provided a photographic shutter in which a spring acts on the shutter blades to open them when a latch which holds them against action is actuated by the motor means. The motor means also closes the blades after a time, and the spring of such motor means acts to hold the blades closed in conjunction with the latch. A retarding mechanism is provided in which two retarding devices are employed, one acting through the other and being connectible to or disconnectible from such other retarding device at will without any coöperation with the controlling member or cam which acts on said other retarding device to vary the action of such device. This arrangement permits a single long cam surface to be employed for obtaining two series of adjustments. The retarding means has a retarding action in two opposite directions during one operation of the shutter, being moved first in one direction and then in the other by the motor means. The connection between the motor means and the retarding means embodies two connectors, one in the form of a single lever and the other in the form of two levers. The motor means embodies preferably two relatively movable members, one of which opens the shutter blades and the other of which closes the blades. One of these motor members may be held temporarily by a detent which is kicked out of detaining position by the other motor member.

What I claim as my invention and desire to secure by Letters Patent is:—

1. A photographic shutter comprising shutter blades, a spring for opening the shutter blades, and motor means for releasing the blades to the action of the spring to effect the opening of the blades and then for effecting the closing of said blades.

2. A photographic shutter comprising shutter blades, a spring for opening the shutter blades, a latch for holding the shutter blades closed, and motor means for operating the latch to release the shutter blades to the action of the spring and then for closing the blades.

3. A photographic shutter comprising shutter blades, a spring for opening the shutter blades, a latch for holding the shutter blades closed, motor means for operating the latch to release the shutter blades to the action of the spring, and a retarding device for retarding the action of the motor means, acting on said latch.

4. In a photographic shutter, shutter blades, motor means embodying two relatively movable members one of which effects the opening of the blades and the other of which effects the closing, and a detent for holding the second named member against closing the blades after the latter has been opened by the first named member, said detent being controlled by the first named member.

5. In a photographic shutter, shutter blades, a spring for opening the shutter blades, a latch for holding the blades closed, and two relatively movable motor members one of which coöperates with the latch to open the blades and the other of which coöperates with the blades to close them.

6. A photographic shutter according to claim 5 in which a detent is provided to hold the second named motor member against closing the blades, said detent being shifted from detaining position by the first named motor member.

7. A photographic shutter according to claims 5 and 6 in which the latch shifts the detent to detaining position when the latch releases the shutter blades.

8. In a photographic shutter, shutter blades, motor means for effecting the opening and the closing of the blades, and a retarding device for said motor means having retarding action in two directions and connected to the motor means to act in both directions during one opening and closing action of the shutter blades.

9. In a photographic shutter, shutter blades, motor means for effecting the opening and the closing of the blades, a train of retarding wheels, and connecting means between said wheels and the motor means for moving the wheels first in one direction and then in the other direction during one operation of the shutter blades to open and close the shutter.

10. In a photographic shutter, shutter blades, motor means for effecting the opening and the closing of the blades, a retarding device, and two separate connectors between the motor means and the retarding device one acting to shift the retarding device in one direction and the other acting to shift the retarding device in the opposite direction during one operation to open and close the shutter.

11. A photographic shutter according to claim 10 in which one of said connectors is a single lever and the other of said connectors consists of two levers one acting through the other.

12. In a photographic shutter, shutter blades, motor means for effecting the opening and the closing of the shutter blades, and a retarding device having a lever moved by the motor means in two directions during one operation of the shutter to open and to close the blades, said lever having a shiftable fulcrum through which the duration of the retarding action is varied.

13. In a photographic shutter, shutter blades, motor means for effecting the opening and the closing of the blades, and a retarding device for the motor means having a retarding action in two directions of movement, said retarding device having a controllable member interposed between its oppositely moving parts and the motor means by which retarding actions of different durations may be obtained.

14. In a photographic shutter, shutter blades, motor means for effecting the opening and the closing of the blades, a retarding device for the motor means having a retarding action in two directions and provided with an oscillatory member, a lever pivoted to said member and operated in opposite directions by the motor means, and a shiftable fulcrum for said lever by which retarding actions of different durations may be obtained.

15. In a photographic shutter according to claim 14 in which the fulcrum is shiftable to aline with the pivot of the oscillatory member in order that the retarder may be rendered inactive.

16. In a photographic shutter according to claim 14 in which the fulcrum of the lever is formed by a surface of a cam shiftable to produce the different retarding actions.

17. In a photographic shutter, shutter blades, motor means for effecting the opening and the closing of the blades, and a retarding device for the motor means having a retarding action in two directions and comprising a train of wheels, an oscillatory member geared to said wheels, a lever pivoted to said oscillatory member and shifted by the motor means in two opposite directions, and a controlling member forming a shiftable fulcrum for said member.

18. In a photographic shutter, shutter blades, and retarding means for delaying the closing action of the blades comprising two retarding devices, one of said retarding devices being controllable to vary the retarding action thereof, and the other acting through the controllable retarding device and being connectible to and disconnectible from said controllable retarding device at will while the latter is adjusted for any speed.

19. In a photographic shutter, shutter blades, and retarding means for delaying the action of the blades comprising two retarding devices, one of said retarding devices acting through the other and being disconnectible from and connectible to said other retarding device at will, and a controlling member for said other retarding device to vary the retarding action, the controlling member being unconnected with the first mentioned retarding device except through said other retarding device.

RUDOLPH KLEIN.